United States Patent [19]
Giacomel

[11] Patent Number: 4,655,679
[45] Date of Patent: Apr. 7, 1987

[54] POWER TRANSLATION DEVICE

[75] Inventor: Jeffrey A. Giacomel, Arlington, Tex.

[73] Assignee: LTV Aerospace and Defense Company, Dallas, Tex.

[21] Appl. No.: 497,998

[22] Filed: May 25, 1983

[51] Int. Cl.⁴ .............................................. F01D 1/36
[52] U.S. Cl. ................................ 415/90; 415/153 R; 415/157
[58] Field of Search ..................... 415/90, 17, 61, 36, 415/42, 43, 47, 76, 157, 158, 153 R

[56] References Cited

U.S. PATENT DOCUMENTS

| | | | |
|---|---|---|---|
| 1,017,438 | 2/1912 | McAuley | 415/36 |
| 1,061,142 | 5/1913 | Tesla | 415/90 |
| 1,061,206 | 5/1913 | Tesla | 415/90 |
| 2,370,526 | 2/1945 | Doran | 60/425 |
| 3,720,480 | 3/1973 | Plowman et al. | 416/241 A |
| 4,164,035 | 8/1979 | Glennon et al. | 415/17 |
| 4,218,176 | 8/1980 | Gawne | 415/90 |
| 4,324,526 | 4/1982 | Berchtold et al. | 415/158 |

Primary Examiner—Robert E. Garrett
Assistant Examiner—J. Husar
Attorney, Agent, or Firm—James M. Cate; S. S. Sadacca

[57] ABSTRACT

An apparatus for translating motive energy includes a rotor structure, having mutually spaced rotor members, adapted to react with fluids within the housing. In one embodiment, the rotor structure is rotationally driven by an external power plant for pumping fluids through a tangentially oriented outlet duct. In a second embodiment, the apparatus is driven by fluid under pressure which is conducted toward the rotor structure through an inlet aligned with peripheral portions of the rotor members, for rotationally driving the rotor structure. A variable geometry inlet control system is provided for controlling fluid flow in response to varying flow conditions and for directioning fluid flow to a portion of the rotor structure. The apparatus incorporates a structural configuration which permits its construction of carbonized composite materials, for operation at elevated temperatures.

25 Claims, 10 Drawing Figures

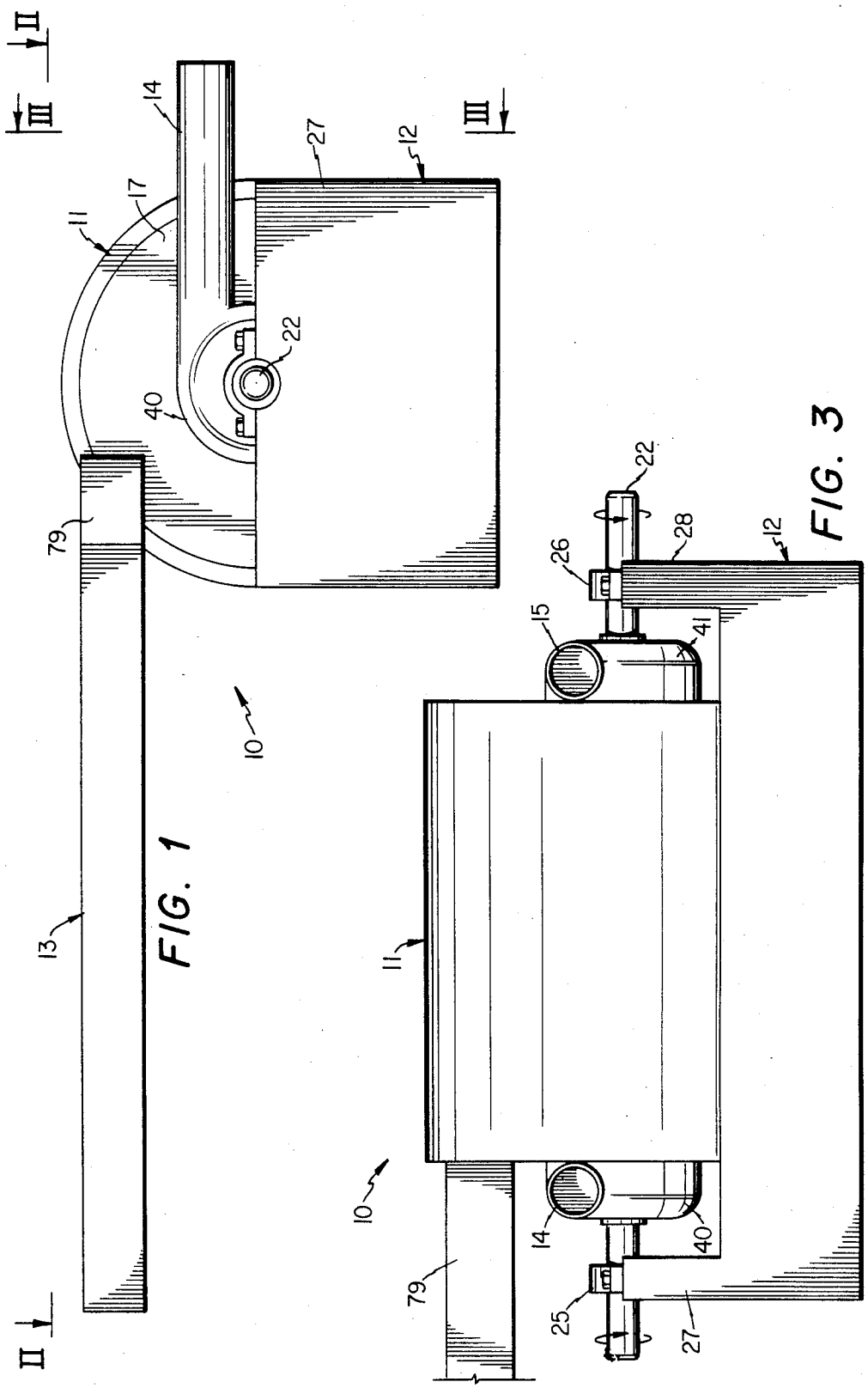

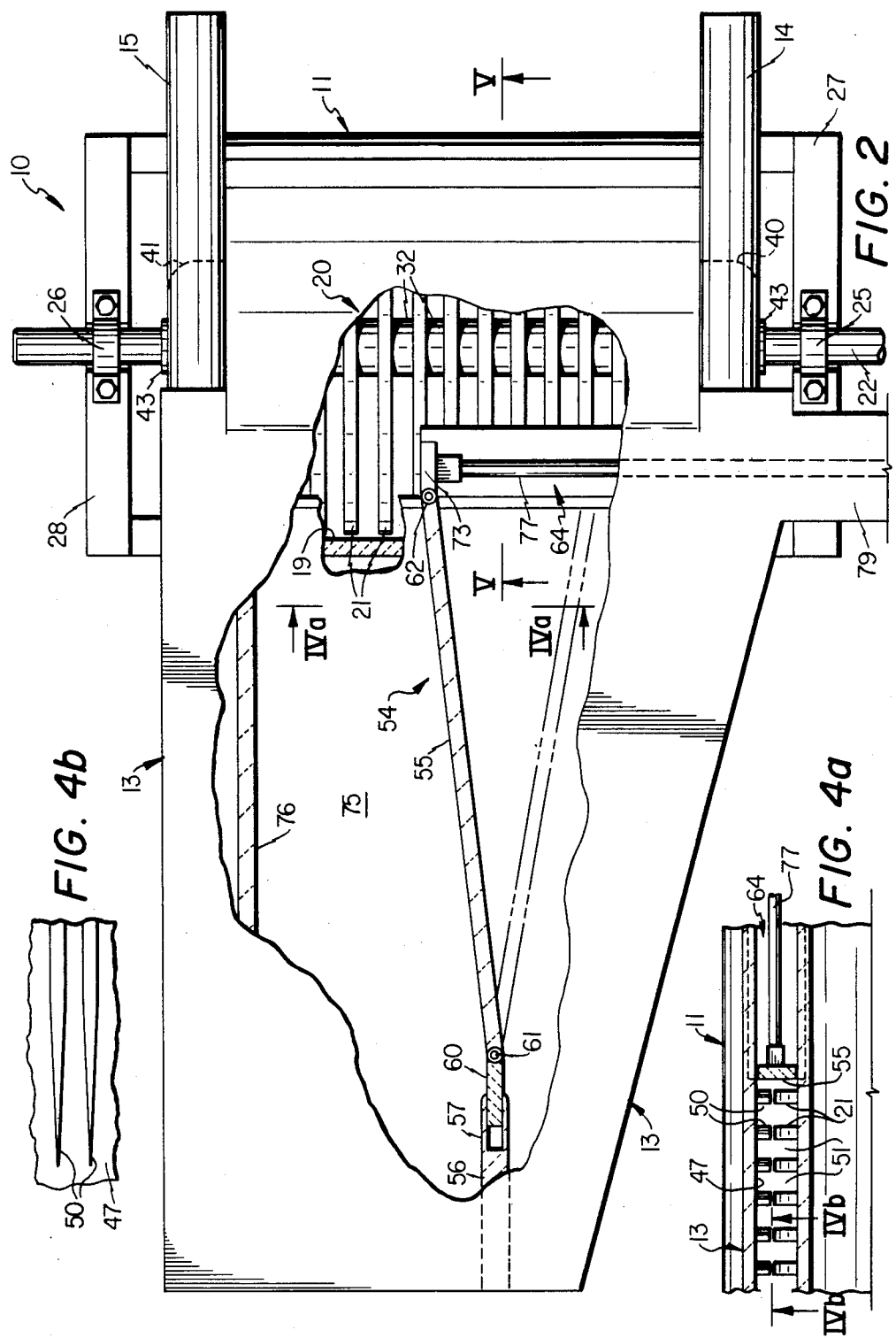

POWER TRANSLATION DEVICE

TECHNICAL FIELD

This invention relates to power translation devices and, more particularly, to turbine and pumping apparatus operable at elevated temperatures.

BACKGROUND ART

Designers of turbines such as those employed in vehicular and aircraft power plants have observed that high operating efficiencies are generally associated with high operating temperatures, because of the greater energy levels of high temperature gases. Internal temperatures of modern turbine engines may typically exceed 1500° F., for example. Moreover, the increased efficiencies potentially obtainable at even higher temperatures have not been realized, largely because of limitations in the properties of materials in current use. Because of the deleterious effects of high temperature gases upon structural components, the use of a variety of metallic and non-metallic materials have been considered, including the ceramics, tungsten alloys, and more recently, carbonized composites.

Whereas ceramic materials are known to be capable of sustaining very high temperatures in certain applications, they tend to be deficient in toughness and resistance to fracture under high stress and vibrational loads. In addition, they are subject to failures, particularly during extended use, when subjected to rapid temperature variances, and to localized thermal shock entailing differing temperatures within an integral component.

Carbonized composite materials are currently being employed in certain aerospace structures which sustain substantial mechanical and thermal stress. Typical applications include the leading edge portions of space craft which are exposed to high temperatures and stresses during reentry. Such composite materials typically include a fibrous component, e.g., fibrous boron or graphite, in a matrix of a thermosetting polymer material, such as a phenolic. Processes for their manufacture typically entail the formation of an uncured workpiece substantially of the configuration desired for the structure, normally with a large proportion of the fibrous components substantially aligned with the axes subject to greatest stress. The workpiece is cured under a prescribed time/temperature/pressure cycle and then pyrolized under higher temperatures to form a high strength carbonized structure, having both fibrous and matrix components in the carbonized state. The cured workpiece, or substrate, may then be coated with an oxidation resistance coating typically containing silicon carbide and silicon metal. Such coated carbon-carbon materials have been demonstrated to maintain structural integrity when exposed to temperatures in excess of 2000° F. and have substantially greater structural strength and toughness than most ceramic structures. Additionally, they may be selectively reinforced to enhance resistance to stress loads along particular axes, as suggested above, and at particular regions, by appropriate orientation and configuration of the fibrous reinforcing material prior to curing.

The commercial manufacture of such composite structures is difficult, however, if parts of complex structural configuration are entailed. For example, whereas multi-bladed turbine rotors of complex configuration may be formed readily of various metal alloys by techniques well known in the art, the manufacture of a carbonized composite rotor having a plurality of blades or buckets and having the capability of sustaining extremely high circumferential and vibrational loads entails substantial technical difficulty. The rotational elements of gas-driven turbine aircraft engines may be driven at rotational velocities exceeding 50,000 revolutions per minute. If formed as a composite structure, lay-up of the fibrous components of such a multi-bladed turbine rotor is difficult because of the structural discontinuities alongside and at the periphery of the rotor, and because of the angular projection of the blades from the plane of the rotor disc. Under the substantial structural loads entailed at high rotational velocities, together with the vibrational cyclical thermal stresses, such multi-surfaces, bladed components are susceptible to distortion and structural failure, and the blades may tend to be broken away from the central disc. In contrast, a rotatable composite disc having an integral, continuous peripheral region (one not divided into multiple blades or buckets) may be more effectively reinforced and manufactured for sustaining the circumferential loads entailed even at very high temperatures and rotational velocities.

A turbine-pump apparatus developed by Nikola Tesla, disclosed in U.S. Pat. Nos. 1,061,206 and 1,061,142, incorporates a rotor structure having a plurality of non-bladed rotor discs mounted coaxially on a rotatable shaft in mutually spaced, parallel alignment. As will be understood more fully from the description hereinbelow of the present system, such "Tesla turbines" and pumps make use of forces derived from surface reactive forces, i.e., forces related to the reaction of a fluid against asperities on the surfaces of the discs, and from surface tension forces related to viscosity of the fluid, i.e., from adhesion of the fluid to the disc surfaces. Thus, fluid injected tangentially into a Tesla turbine apparatus between the discs reacts with the disc surfaces, because of surface tension and reactive impelling forces, to drive the discs in the direction of flow. The teachings of the Tesla U.S. Pat. Nos. 1,060,206 and 1,061,142 are hereby incorporated by reference.

As disclosed in the U.S. Pat. No. 1,061,142 patent, such rotatable, multiple disc structures are also operable as fluid pumps. When the discs are rotated by means of an external motor, fluid is ejected by the discs through a fluid outlet aligned tangentially with the discs. Inlets are provided in the housing communicating through the central regions of the discs, as disclosed in the U.S. Pat. No. 1,061,142 patent. Thus, while the discussion herein will be directed largely to an improved, gas driven turbine, it will be apparent from the description and from the teachings of the U.S. Pat. No. 1,061,142 patent that such power translation apparatus may also be operated as fluid pumping devices.

Although such Tesla power translation apparatus have in fact been employed in certain industrial applications, they are not commonly used in modern gas driven turbines. As will be understood from the description hereinbelow of the operation of the present system, propulsive gasses of substantial temperatures and mass flow rates are preferably employed to drive such turbine apparatus. Because of the high flow energy and operating temperatures, conventional, metal components are susceptible to rapid deformation and deterioration when used in the preferred embodiment of the invention. Furthermore, conventional Tesla turbine configurations (as exemplified in U.S. Pat. No.

1,051,206) are undesirably inefficient with respect to energy transfer and aerodynamic flow. In such configurations, as the inflowing gaseous mixture enters the generally cylindrical chamber in which the multiple discs are rotatably mounted, flowing from an inlet duct along a tangential axis toward the discs, the flow is permitted to expand within an enlarged inlet throat, and subsequently within an annular, circumferential manifold cavity or ramp as it merges with the interior disc chamber and gradually merges with and flows between the discs along a spiral path. Because the gases under high pressure passing through such an inlet throat or chamber are permitted to expand, they lose potential energy while increasing in turbulence, and they subsequently further increase in turbulence as they enter the spaces between the discs. Energy is therefore dissipated by the expansion of the gases within the throat and manifold chambers prior to reaction of the gases with the discs. As the turbulent gases strike the peripheral edges of the discs they are divided and enter the multiple annular spaces defined intermediate the mutually adjacent discs. Further flow inefficiencies result as the expanding gases react turbulently with the peripheral edges of the discs and enter the intermediate spaces.

Conventional Tesla turbine apparatus are further undesirably inefficient when the velocity of the propulsive gaseous flow is required to be varied from a narrow, optimal range. That is, they suffer from an undesirable, substantial decrease in efficiency when the flow velocity of the propulsive gases falls below a given optimal range, related to the diameter and spacing of the discs and the respective areas of the inlet and outlet openings.

Thus, inefficiencies result in conventional Tesla turbines from the loss of energy experienced when the inflowing gases are permitted to expand in an inlet throat upstream of the disc chamber, when the turbulently expanding gases strike the disc edges, and because of the inefficiencies entailed during operational regimes other than a full-power mode, in which the gaseous flow rate is "tuned" to the particular rotor and housing. The Tesla turbine and pump apparatus has not been practicalle for use in modern gas-driven turbine engines or high temperature pumps.

DISCLOSURE OF THE INVENTION

It is, accordingly, a major object of the present invention to provide new and improved turbine and pumping apparatus.

Another object is to provide such an apparatus having a plurality of planer, disc shaped rotors which are integrally constructed and free of peripheral discontinuities, having no turbine blades or buckets.

A still further object is to provide such a turbine apparatus which is of high efficiency over a wide range of power levels.

A further object is to provide a gas driven turbine, having a plurality of disc-shaped rotors, which is reliably operable at elevated temperatures in excess of 1800°-2,500° F.

A still further object is to provide such a gas-driven turbine having no expanded manifold inlet chamber, whereby expansion of inlet gases occurs within the multiple parallel spaces intermediate the discs rather than in an inlet throat or chamber upstream of the discs.

Yet another object is to provide such a turbine in which the inlet gases are initially divided within multiple inlet channels in register with respective annular cavities between the multiple discs, whereby flow turbulence which otherwise results as the gaseous flow passes between the discs is substantially reduced.

A still further object is to provide such a turbine apparatus having inlet means for maintaining the inlet flow at a substantially constant flow velocity despite changes in total mass flow rate, for enhancing operating efficiencies of the turbine as the mass flow rate is varied during differing operational regimes.

Other objects and advantages will become apparent from the specification and drawings and from the accompanying claims.

BRIEF DESCRIPTION OF THE DRAWINGS

In the drawings:

FIG. 1 is a side elevation of the apparatus;

FIG. 2 is a plan view of the apparatus taken as on line II—II of FIG. 1, with portions of the housing and of the duct wall broken away for clarity;

FIG. 3 is an end view of the apparatus taken as on lines III—III of FIG. 2;

FIG. 4a is a fragmentary, cross-sectional view of the inlet duct and housing in an enlarged scale taken as on lines IVa—IVa of FIG. 2 and showing in greater clarity the inlet flow path;

FIG. 4b is a fragmentary plan view of two of the inlet divider vanes;

DETAILED DESCRIPTION

Figure 5:
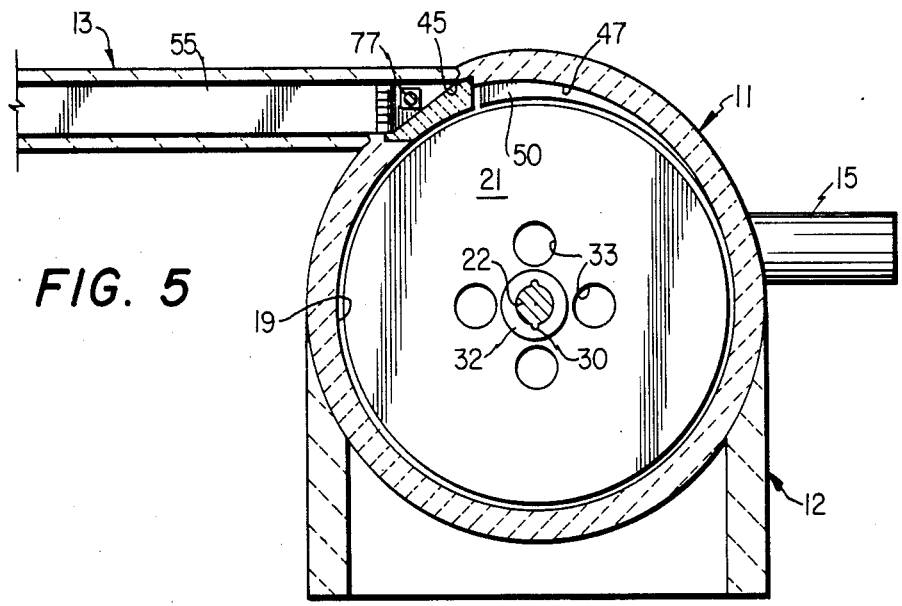
FIG. 5 is a cross-sectional view of the housing and inlet duct showing one of the rotor discs.

Referring initially to FIGS. 1 and 2, a preferred embodiment of the turbine apparatus 10 includes a generally cylindrical housing 11 mounted upon a base structure 12, having an inlet duct 13 extending tangentially from the housing and communicating with its interior chamber 19. With additional reference to FIGS. 2 and 3, first and second outlet ducts, 14, 15 communicate with the interior of the housing through outlet openings 16, seen more clearly in FIG. 7, in the respective housing end walls 17, 18. Preferably, the housing 11 and associated inlet and outlet passageways are formed of carbonized composite panels.

Figure 7:
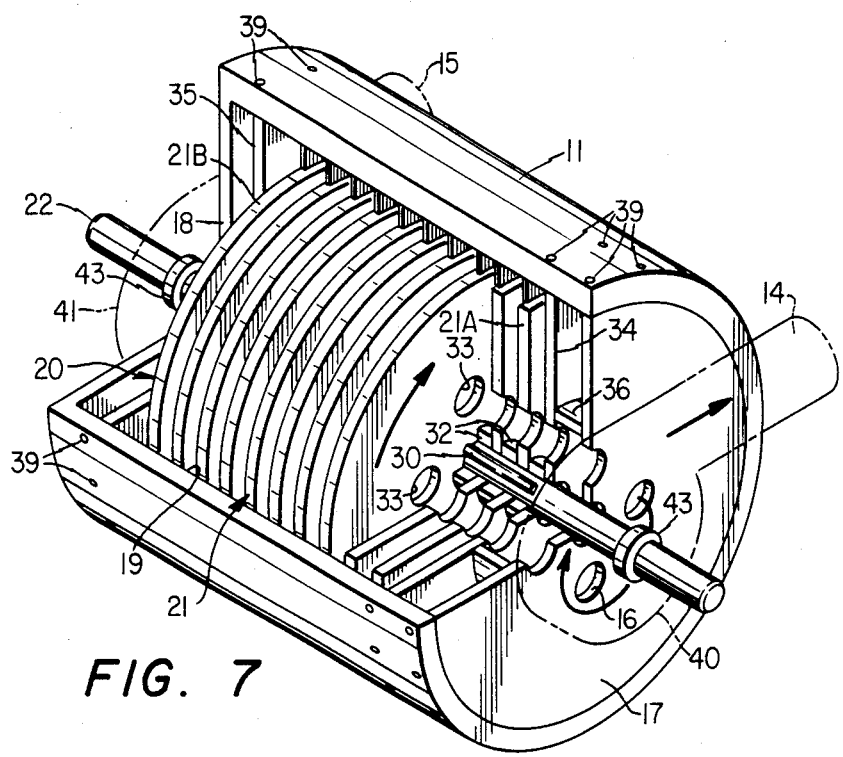
FIG. 7 is a perspective view, partially broken away, showing the rotor discs and outlet duct.

With reference to FIGS. 2 and 7, a rotor structure 20 is coaxially and rotatively mounted within cylindrical chamber 19, defined within the housing 11. The rotor structure 20 incorporates a plurality of mutually spaced discs 21 non-rotatably and coaxially mounted upon a common shaft 22, which extends through corresponding circular openings formed centrally through the respective sidewalls 17, 18 of the housing 11. The end portions of the shaft 22 extend beyond the respective housing end walls 17, 18 and are rotatively journaled within first and second thrust bearing structures 25, 26, which are mounted upon pedestal structures 27, 28 affixed to or formed integrally with the base structure 12 at respective locations spaced laterally from and on opposite sides of the housing 11, as shown most clearly in FIG. 3. The bearings 25, 26 are preferably spaced beyond the housing end walls 17, 18 to minimize deleterious effects which otherwise result from heat transfer from the housing 11 to the bearings 25, 26 during operation, from high temperature gaseous flow within the housing.

The central region of the shaft 22, i.e., the portion disposed within the housing chamber 19, is integrally formed with raised, linearly extending ridges or keyways 30 (FIG. 5) which seat within corresponding grooves formed in the circular openings extending centrally through the respective annular discs 21, whereby the discs are non-rotatably mounted on the shaft. Multiple spacing rings 32, as seen most clearly in FIGS. 2 and 7, are similarly mounted on the shaft 22 between the mutually adjacent discs 21, for maintaining equal spacing between the discs.

As seen most clearly in FIG. 7, the discs 21 are preferably formed as planar, circular plates of carbonized composite material, and they are equidistantly mutually spaced along the shaft 22 by the spacer rings 32. A plurality of exhaust openings 33 are formed through each disc 21, in an annular, concentric array and at mutually spaced intervals around the shaft 22. The openings 33 are adjacent to but spaced radially beyond the spacer rings 32. Preferably, the discs 21 are angularly aligned upon the shaft 22 with their exhaust openings 33 in mutual alignment, in register, whereby continuous exhaust flow passageways are defined through the exhaust openings 33, extending parallel to and alongside the shaft 22.

First and second annular partitions 34, 35 are fixedly mounted within opposite end portions of the housing 11, spaced inwardly from the endwalls 17, 18, respectively. Cylindrical spacer rings 36 extend between the endwall 17 and partition 34, and between the endwall 18 and the partition 35, and are aligned coaxially around the shaft 22. Exhaust openings 33' are formed through the partitions 34, 35, in alignment with the exhaust openings 16 formed through the endwalls 17, 18, at locations spaced radially within the cylindrical rings 36 and in radial alignment with the openings 33 formed through the discs 21. The end portions of the cylindrical rings 36 are preferably affixed to the repective adjacent endwalls 17, 18 and partitions 34, 35, whereby an exhaust flow pathway is formed through the partitions and endwalls within the cylindrical rings 36, in radial alignment with the exhaust openings 33 formed in the discs 21. The exhaust ducts 14, 15 communicate with the exhaust openings 16 of the respective endwalls 17, 18 through first and second cylindrical manifolds 40, 41, (FIG. 3) respectively, which are affixed to the housing endwalls 17, 18, respectively, to define cylindrical manifold chambers communicating between the exhaust openings 16 and the exhaust ducts 14, 15. The exhaust ducts 14, 15 extend tangentially from the manifolds 40, 41 and communicate with the manifold chambers through corresponding openings formed through the sidewalls of the manifolds.

The housing and duct components are suitably bonded or bolted together by conventional fastening means in low temperature areas. In high temperature regions, however, conventional fastening means are not sufficient. The components are preferably formed integrally, or formed as component parts which are bonded together by the application of an uncured phenolic resin as a bonding agent, and then subjected to curing and pyrolization processes, for producing an integral assembly. As viewed in FIG. 7, for example, the second endwall 18 is formed integrally with the cylindrical housing 11, and the first endwall 17 is fastened in place by reinforcing pins 39. It is preferably further secured by the above-described bonding and pyrolization process. During assembly of the components, the rotor structure 20 is installed prior to installation of the endwall 17 and the intermediate partition 34. An anti-oxidation coating is applied to surfaces subject to high temperatures in operation, including the surfaces of the reinforcing pins 39. If the apparatus is to be used in an application such as expendable missile or the like having a brief operational cycle, less stringent assembly and coating procedures may be employed.

High temperature journal bearings 43 (FIG. 7), are seated within the outer sidewalls of the first and second cylindrical manifolds 40, 41, where they can be conveniently cooled and lubricated, and the shaft 22 is rotatably and sealingly fitted within the bearings 43 for preventing any substantial leakage of gaseous flow from the housing chamber 19 around the shaft 22. It is generally preferable that the total exhaust area provided by the disc exhaust openings 33 be substantially equal to that of the outlets 16, and to the respective cross-sectional areas of the outlet ducts 14, 15.

The rotor structure 20 is maintained in a central position within the housing 11, and prevented from any substantial longitudinal translation, suitably means of thrust bearings 25 and 26 (FIG. 3) mounted on the pedestals 27, 28. Alternatively, suitable locking washers or keys, not shown, are provided on the end portions of the shaft 22 external of the housing 11, adjacent the thrust bearings 25, 26, for preventing lateral displacement of the shaft 22 and rotor structure 20. A slight gap is provided between the end discs 21 and the inwardly facing side surfaces of partitions 34 and 35 to prevent unwanted friction or wear.

Figure 6:
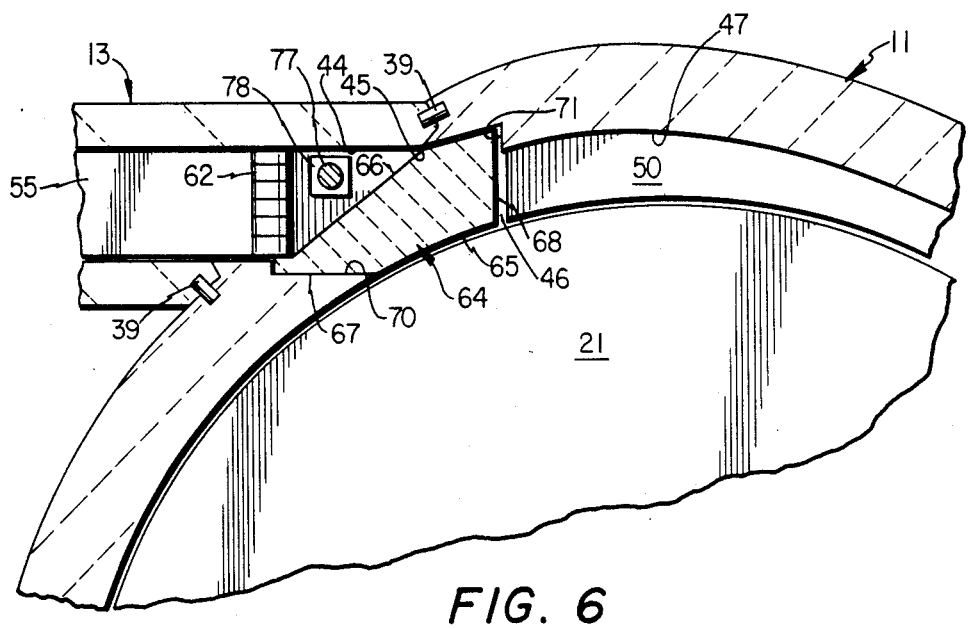
FIG. 6 is a fragmentary sectional view, taken along the same plane as FIG. 5 in an enlarged scale, showing the variable geometry inlet door mechanism.

With additional reference to FIGS. 5 and 6, the inlet duct 13 is preferably of generally rectangular cross section and extends tangentially of the housing 11. The inlet duct 13 communicates between a supply of gas under pressure, not shown, and the housing chamber 19 through a corresponding inlet opening 45 formed through the housing 11 and extending longitudinally along the length of the housing 11. As may be seen in FIGS. 5 and 6, the inlet duct 13 is in substantial alignment with the peripheral portions of the discs 21, whereby inflowing gases may be directioned tangentially against the peripheral portions of the discs. As may be seen more clearly in FIG. 6, an inlet throat area 46 is defined between the inlet duct 13 and the interior of the housing 11. The throat area 46 is not of an expanding cross-sectional area relative to the inlet duct, but instead provides a continuation of the inlet 13 as it merges into the chamber 19. The upper interior surface area 47 of the housing 11 merges quickly inwardly toward the rotor structure 20, whereby the propulsive gasses are merged into the rotor structure 21 within one quarter of the circumference of the discs 21. As seen most clearly in FIG. 5, the upper wall portion of the housing 11, which defines the upper wall surface 47, is preferably curved slightly outwardly beyond a precisely cylindrical configuration, to enlarge the inlet opening 45 and permit rapid merging of the inlet flow into the rotor structure 20. The housing 11 is nevertheless of substantially cylindrical configuration. With additional reference to FIGS. 4b and 4a, a plurality of flow divider vanes 50 are affixed to the upper surface area 47, in mutually parallel alignment and in register with respective adjacent ones of the discs 21. The vanes 50 project radially inwardly from the upper surface area 47 of the housing 11 and are tapered, from their leading edges (which confront the inlet duct 13) toward their trailing edge portions. The vanes 50 extend parallel to and immediately adjacent the peripheral edges of respective ones of the discs 21. The leading areas of the vanes 50 are narrowed, in knife-edge configuration and, as seen in the drawing, they extend rearwardly as respective divergent/convergent airfoils, as seen most clearly in FIG. 4b.

The purpose of the vanes 50 is to divide the inflowing gasses into segregated inlet channels 51 with as little turbulence as possible as the gases pass through the inlet throat area 46 and into the spaces formed between the discs 21. Turbulence is minimized because the gasses are not permitted to expand significantly prior to their entry into the rotor structure 20 and, secondly, because the inlet channels 51 (FIG. 4a) defined by the throat 46, vanes 50, the confronting discs 21, and the upper surface area 47 act to smoothly divide the gasses into individual flow paths in register with respective ones of the annular spaces between the discs 21.

With additional reference to FIG. 5, the interior surfaces of the inlet duct 13 and housing 11 are subjected during operation to high pressure gaseous flow driven along the duct 13 toward the housing 11 under high pressures from a gas generator, not shown, and subsequently conducted through the housing opening, as seen more clearly in FIG. 6, tangentially toward the rotor structure discs 21. Operation of the apparatus will be described in more detail in later sections. As has been suggested in the previous discussions of the prior art, however, at temperatures above 1800° F., available metals and alloys begin to suffer deterioration and deformation in such rotor structures. Modern turbines employ high temperature resistant nickel and cobalt alloys, but any increase above such temperature ranges results in deleterious effects, even to such alloys. As suggested above, however, propulsive gasses at higher temperatures are of higher energy levels and can produce significantly higher efficiencies in such disc-type turbines. Thus, in accordance with the present invention, those portions of the turbine apparatus 10 which are exposed to high temperature propulsive gases are formed of composite materials, of sufficient thermal stability and toughness to sustain the thermal and physical stresses entailed, including the vibrational and centrifugal forces sustained at very high rotational velocities of the rotor structure.

To summarize, because of the high thermal and physical stresses entailed, it has previously been impossible to manufacture practicable turbine apparatus operable at the high efficiencies obtainable above the 1500°-2000° F. temperature range. It has been impracticable to employ carbonized composite materials in turbine/pump apparatus. In accordance with an important aspect of the preferred embodiment of the present invention, however, carbonized composite structures are employed for the high temperature components of the system. As suggested earlier, conventional turbine components are of such complexity that they are not readily formed of such composite materials. Accordingly, the present apparatus is of a construction which does not incorporate conventional turbine construction, but incorporates a combination of components particularly adapted for practicable construction and assembly from carbonized composite panels, sheets, and rods. Further, the assembly and bonding techniques described above permit manufacture of the multicomponent turbine apparatus 10 as a rugged unit capable of sustaining the mechnical and thermal loads. As discussed above, the manufacturing methods for forming the individual component parts of such "carbon carbon" composite structures are known in the art and therefore will not be described in detail herein. It is significant however, that the assembly and rotor structure 20 are of a configuration particularly suited for formation by such processes, because of the absence of vanes, blades, and buckets or the like on the peripheral areas of the discs, and because the rotor structure 20 may be readily assembled from non-detailed, symmetrical components. Additionally, the discs may be constructed with continuous fibrous reinforcement of optimal configuration as integral, planar workpieces, and thereby attain the substantial structural integrity under high rotational velocities and temperatures which is required for the environment entailed.

Continuing the description of the preferred embodiment, with reference to FIGS. 2 and 5, the inlet duct 13 is suitably of approximately rectangular cross-section and, as stated above, communicates tangentially with the interior of the housing 12 through the rectangular opening 45 formed through the side of the cylindrical housing 11. Because no enlarged cavity is interpositioned between the inlet duct 13 and the housing interior, expansion of the injected gases occurs substantially entirely within the spaces intermediate the discs, rather than in an inlet cavity or manifold.

In operation, propulsive gasses, typically under widely varying pressures, are conducted through the inlet duct and throat area 46 from a gas generator, not shown, through the channels 51 (FIG. 4a) and directly into the annular spaces defined between the discs 21. The continuous, gradual curvature defined by the upper wall surface 47 conducts the flow smoothly around the peripheral regions of the discs 21, whereby tangential and radial forces, derived from reactive and viscous engagement of the gases with the mutually confronting disc surfaces, induce rotational movement of the rotor structure 20 upon the bearings 25, 26. Gas under pressure is diverted by the upper surface 47 and caused to flow around the cylindrical housing chamber 19 and is caused to follow a spiral flow path due to the negative pressure gradient toward the central region of the chamber 19, from which it exits through the exhaust channels defined through the outlets 33, 33', and the outlets 16, into the exhaust manifolds 40, 41, and subsequently through the exhaust ducts 14, 15. Because the inflowing gases are of a substantial pressure and energy level, they react efficiently with the peripheral regions of the rotor discs. As the gases flow spirally, radially inwardly, and subsequently through the exhaust openings 33 and the exhaust ducts 14, 15, their energy levels and temperature are substantially reduced.

The power output of the apparatus is dependent upon a number of design variables, including the flow rate, pressure, and temperature of the propulsive gasses, the inlet passageway and outlet areas, and the number, diameter, and mutual spacing of the discs. The dimensions of the components will therefore relate to the operating envelope of the specific application. the design and adaptation of the specific rotor structure of such Tesla turbines and pumps for achieving desired operating outputs is accomplished by techniques known to those in the art, as typified by the study detailed in the article of Dr. Warren Rice, pages 253 to 258, Journal of Fluids Engineering, September 1974. Because of the multiplicity of design parameters, empirical adjustments of the rotor disc spacings are advantageously employed for refinement of operation for a particular application. Output is generally increased as the number and diameter of the discs is increased, as the spacing between the adjacent discs is lessened, and as the gas flow velocity is increased.

As previously discussed, the efficiencies of such apparatus are sharply reduced when the flow velocity of the inflowing propulsive gases falls below a nominal range. In operation, this sharp drop in power output normally renders such Tesla apparatus difficult to control under varying power levels, in that a relatively minor reduction in mass flow rate may precipitate a substantial loss of output. Conventional Tesla turbines are thus undesirably sensitive to variations in flow rate, and it is extremely difficult to obtain a gradual throttling of the rotational velocity by controlling the mass flow rate, or to provide a relatively constant velocity under varying loads by varying mass-flow rate.

In the preferred embodiment of the present invention, however, means are provided for maintaining the gas flow velocity at a substantially constant level as the total mass flow rate is varied. With primary reference to FIG. 2, a flow control apparatus 54 is provided for permitting the application of propulsive flow to all of the discs, or to only a portion of the rotor structure 20, as the mass flow rate is varied. The flow control apparatus 54 employs an elongated, directionable guidewall 55 which is mounted within the inlet duct 13, with its width projecting substantially between the upper and lower duct walls. (Directional terms such as "upper", "lower" and the like are employed herein with reference to the drawing for ease and clarity of description, and are of course not to be interpreted as suggestive of a single orientation or operational mode for the turbine apparatus 10.) In its preferred embodiment, the directionable guidewall 55 is constructed of an elongated, generally rectangular sheet of carbonized composite material extending upstream within the inlet duct 13, from the housing inlet opening 45 toward a mounting block 56 which is affixed in an upright position within the duct 13 adjacent one side of the duct. The mounting block 56 is suitably a sheet of composite material connected between the upper and lower duct walls and extending parallel to the duct axis. Clevis 57 is suitably formed on the downstream end of the mounting block 56, and a plate member 60 is slidably mounted within the clevis 57. The upstream end portion of the directionable guide wall 55 is pivotally connected to the plate 60 by a vertically extending hinge structure 61, also formed of carbonized composite material and employing a composite rod as a shaft, whereby pivotal movement of the guide wall 55 within the duct 11 is permitted about this vertical axis upon the hinge 61. The guidewall 55 is vertically oriented within the duct 13 and extends loosely between the upper and lower duct walls for effecting a substantially fluid sealed association between the upper and lower duct walls, but with sufficient upper and lower clearance to permit lateral pivotal movement of the guide wall within the duct. The opposite, downstream end portion of the guidewall 55 is pivotally connected, by a hinge structure 62 similar to hinge 61, to a slideable valve gate structure 64 which is mounted for lateral sliding movement within the housing inlet opening 45.

As seen more clearly in FIG. 6, the slideable valve gate structure 64, in cross section, is formed substantially as a moveable section of the cylindrical housing wall, extending, in width, across the housing inlet opening circumferentially across the adjacent portions of the rotor discs 21, and extending longitudinally substantially along the width of the rotor structure 20, when positioned fully extended across the opening 45. In cross section, the inner, arcuate surface 65 of the gate structure 64 is substantially shorter than the outer surface 66, and first and second edge surfaces 67, 68 are preferably disposed along mutually diverging planes; the surfaces 67, 68 suitably extend along substantially perpendicular axes. Corresponding, first and second angular cutout surfaces 70, 71 are formed in the housing 11, extending along the length of the inlet opening 45 for defining mating surfaces against which the gate structure end surfaces 67, 68 are slideable seated, and for providing an interlocking relationship between the gate structure 64 and the housing 11, constraining the gate structure within the housing opening and prventing any excessive flexing of the structure 64 under lateral loads, while permitting slideable movement of the structure longitudinally along the longitudinal axis of the opening 45.

During operation, loads which are exerted against the valve gate structure 64 by fluid pressures within the inlet duct 13 tend to urge the gate structure rearwardly toward the housing 11, whereby rearward loads are transferred primarily to the vertical segment of the second cutout section 71, and secondarily against the first cutout section 70. Bending and torque stress loads on the valve gate structure are thereby substantially minimized by interlocking relationships of the gate structure 64 against the slideable tracks 70, 71.

The valve gate structure 64 has a first end portion having a perpendicularly projecting mounting flange 73 formed thereon, extending in a plane parallel to the discs 21 and the plate member 60, to which the upstream end portion of the directionable guide wall 55 is hingedly connected. The hinge structure 62 is mounted vertically on the mounting flange 73, whereby the directionable plate member 55 is caused to sweep generally pivotally across the inlet duct 13 in response to longitudinal movement of the valve gate structure 64. Such movement also translates the plate member 60 axially, inwardly within the clevis 57, upon the plate 50 when approaching an intermediate position (in which the plate 55 extends perpendicularly from the gate 55 and the housing longitudinal axis.) The valve gate structure 64 is longitudinally translatable between a first, projected position, which lies beyond that shown in solid lines in FIG. 2, in which it extends across a majority of the discs, (e.g., in which it covers approximately 90 percent of the length of the inlet area, and a second, retracted position, as shown in broken lines in FIG. 2, in which it is withdrawn from the rotor structure and in which the housing inlet duct 45 is unobstructed along the length of the rotor structure. In the retracted position, the second end portion of the valve gate 64, and the actuator rod, project outwardly from the housing 11 within an actuator housing 79, which communicates with and projects laterally from the inlet duct 13.

As may be seen in FIG. 2, an inlet duct channel or passageway 75 is defined within the inlet duct 13, between the upper and lower duct walls, and between the moveable, directionable guide wall 55 and a confronting, fixed sidewall partition 76 extending longitudinally of the duct along its side opposite the directionable guide wall. When the valve gate 64 is in its retracted position, in which the housing inlet 45 is fully opened, the duct passageway 75 is of a divergent cross section, diverging along its length toward the inlet 45. When the gate 64 is conversely positioned in its projected position, the passageway 75 converges toward the inlet 45, for reasons which will be understood from the description hereinbelow.

The gate structure 64 and guidewall 55 are positioned by an actuator, now shown, through an actuator shaft 77 which has its distal end portion connected to the guidewall 55 by means of a hinge structure 78 mounted on the mounting flange 73. The actuator is suitably mounted in an actuator housing 79, affixed to a side portion of the duct 13 and suitably supported by a portion of the pedestal structure 27, and extending outwardly from the adjacent sidewall of the inlet duct 13. A power takeoff gearing and transmission apparatus, not shown, is connected to the rotor shaft as required for the particular application.

In operation, the valve gate structure 64 is retracted to its open position during operation under fully powered conditions, i.e., during substantial inflowing gaseous flow at or above a range at which the turbine 10 is most efficiently operable. As has been previously discussed, when the gaseous flow velocity intermediate the rotor discs 21 falls below the optimal range, the efficiency and rotational velocity of the turbine decreases sharply. Such an effect is prevented, in the present system, by translating the valve gate structure 64 to its projected position, wherein the directionable guidewall 55 is pivoted in a counterclockwise direction, as viewed in FIG. 2, wherein the inlet duct passageway 75 converges toward a relatively narrow portion of the housing inlet opening 45. The flow velocity of the inflowing gas passing through the inlet 45 is thereby increased, because of the reduced area of the inlet 45 and because of the smoothly converging flow path 75, and the gaseous flow which is conducted to react with the discs 21, adjacent the portion of the inlet 45 which remains open to the duct 13, is thus maintained at a relatively constant flow velocity despite a reduction in the net mass flow rate through the duct 13. It will be understood that the net output torque or power available from the rotating disc structure 20 decreases as the inflowing mass flow rate decreases, in that the gaseous flow is applied only to a portion of the rotor structure 20. In effect, only a portion of the discs are then operable. However, the flow velocity of gasses which are directed to the selected percentage of the rotor discs is substantially higher than would be the case if the reduced mass flow were applied to all of the discs. Because of the exponential increase in efficiency of such turbines as the gas flow rate is increased, within a nominal operating range, the high flow velocities applied only to a few of the discs provides an available, usable output which is substantially higher than that which would be obtainable by applying the reduced total mass flow to all of the discs, at a lower flow velocity.

During operation under normal loads, the system is operable to provide a gradual, controllable decrease in output velocity as the flow rate is decreased, providing a non-exponential, proportional relationship between inlet mass flow rate and output velocity. Similarly, the flow control apparatus 54 may be employed to provide a variable torque output which may correspond with a variable load condition, in which it is desired to maintain a constant velocity under varying load conditions.

Whereas, the discussion thus far has referred largely to the use of the system as a gas-driven turbine, it will be understood from the initial discussion of the Tesla U.S. Pat. No. 1,061,142 that the apparatus may also be employed as a fluid pump, wherein motive energy is applied in the form of torque applied by an external motor to the drive shaft for rotating the rotor structure 20 in a reversed, counter-clockwise direction as viewed in the drawing. Fluid within the housing, between the rotor discs, is driven in a rotational direction, along an outward spiral path, and ejected tangentially outwardly through the (outlet) 45 and along the duct 13. Because of the resultant pressure drop within the chamber 19, fluid is pumped into the chamber through the ducts 14, 15. The variable flow control apparatus 54 is advantageously operable to vary the number of operable discs 21, i.e., discs reacting with the fluid, whereby efficient flow velocity may be maintained through the housing during a condition in which total flow is reduced, when it is desired to reduce total flow but to maintain pumping efficiency. Such a pumping apparatus, when constructed of the carbonized composite materials discussed above, is uniquely suited for pumping fluids at very high temperatures.

Figure 8:
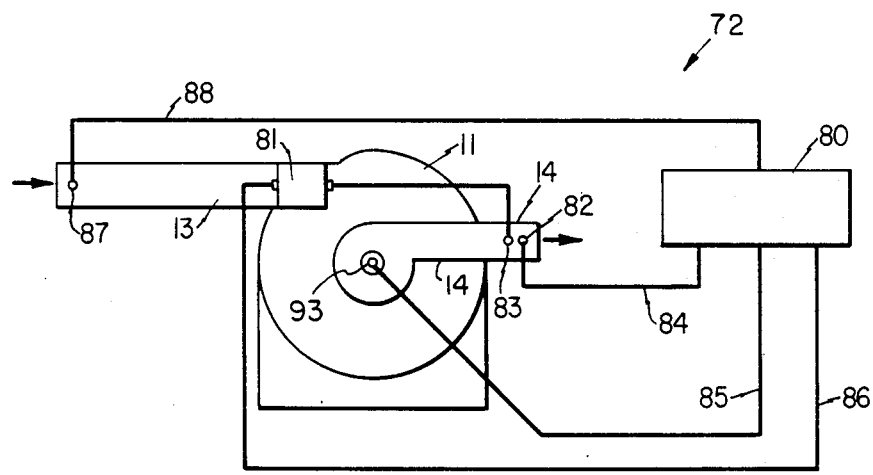
FIG. 8 is a diagrammatic representation of the control system for the turbine apparatus.

A control system 72 (FIG. 8) is provided for controlling the position of the valve gate structure 64 and guidewall 55 in response to varying fluid flow conditions. With reference to FIG. 8, a microprocessor 80, which is suitably a Hewlett Packard Model 3054C computer based data acquisition and control system having a model 3497A data acquisition and control unit, a 3456A digital voltmeter, and a 3437A system voltmeter, is provided. The ROM unit is programmed with an algorithm adapted to process signals derived from flow condition sensors mounted within the inlet and outlet channels, for providing an output signal to a servocontrol and position transducer device 81 connected to the actuator, for commanding the actuator to position the valve gate structure 64. A first sensor set 82 which includes sensor elements responsive to pressure, flow velocity, and temperature, is mounted within at least one of the outlet ducts 14, 15, and its output is fed to the microprocessor through a multi-conductor cable 84. A second, similar sensor set 83 is also installed within the outlet duct 14, and its output is fed to the servocontrol transducer/sensor 81. A velocity sensing transponder 93 is mounted external the housing adjacent the shaft 22 for providing an output signal corresponding to shaft rotational velocity and torque, for transmitting digitally encoded signals to the microprocessor 80 through cable 85. A third sensor set 87 is mounted in the inlet duct 13 providing signals to the microprocessor 80, through conductor 88, indicative of inlet fluid temperature, flow rate, and pressure within the inlet duct 13.

Figure 9:
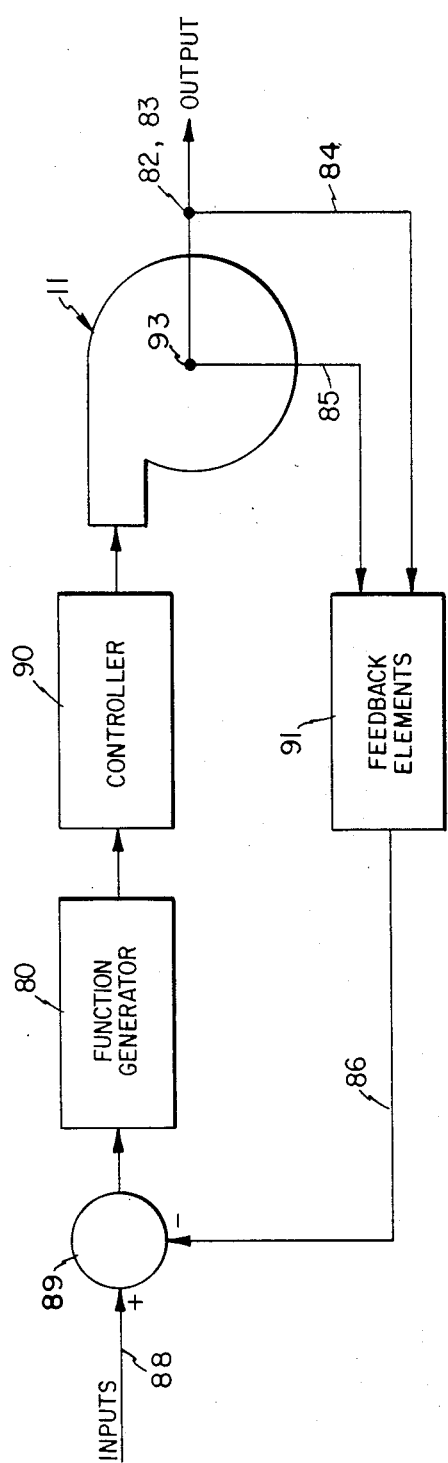
FIG. 9 a functional block diagram of the control unit.

Referring additionally to FIG. 9, a flow diagram is employed which is repesentative of the data flow paths entailed in a typical embodiment of the processor circuit. The processor 80 of FIG. 8 is represented in its several functions, as encompassing feedback elements 91, a comparator 89, and the actuator servocontroller 81 (FIG. 8). The comparator 89 is a comparator circuit which functions as an error signal sensor, receiving inputs through conductor 88 (FIG. 8) from the inlet sensor set 87. The comparator 89 compares the inlet condition signals derived through data link conductor 88 with signals derived through data link conductor 86, which is part of a feedback loop for receiving signals derived from the shaft output sensor 93 through conductor 85, and signals derived from the outlet duct sensor sets 82, 83, all of which are fed through a feedback processing circuit 91 which translates the raw signal received from the sensor into a digitally encoded signal format. The comparator 89 is a multifunction device operating to calculate percent error signal corresponding to the respective differences between the inlet and outlet temperatures, pressures, and flow rates, and to transmit output signals corresponding to the respective error signals, and to the shaft velocities and torque, to a function generator 80. The function generator 80 incorporates the processor controlling hardware and software, including algorithms for cyclically processing the data. The algorithms are suitably derived as those described in the previously referenced article of Dr. Warren Rice, appearing in the American Society of Mechanical Engineering *Journal of Fluid Engineering*. The function generator solves the algorithms to provide two outputs relating to the turbine operation, corresponding to the actual and optimal delta values between the inlet and outlet sensors, for the current flow and load conditions. The equations are cyclically solved, and differences between the optimal and actual values are entered into the processor 80 which provides position correction commands, in accordance with permanently stored algorithms, to a controller 90. The controller processes and amplifies the position correction signals and provides command signals to the actuator servocontrol 81.

The processor 80 may be programmed to provide an optimal power output under given inlet conditions, or alternatively, to provide a substantially constant shaft velocity, under varying conditions, and thereby provides substantial versatility of operation. An alternative, mechanical control apparatus, not shown, which is less versatile and precise but which provides a degree of operative control for less critical applications, incorporates a spring which is connected for continuously urging the valve gate structure toward its projected position (in which the housing inlet opening is substantially closed.) Suitably, a spring is connected between the actuator rod 77, and structure fixed relative to the housing, under compression or tension, for urging the valve gate toward its projected position. Preferably, the spring is positioned external of the high temperature regions, suitably in the housing 79. The spring has a spring rate sufficient to deploy the gate structure in its projected position under low mass flow rate conditions, but not sufficient to overcome gaseous pressure within the duct 13 exerted against the directionable guide wall during higher mass flow rate conditions under which the gate structure is optimally positioned in its retracted position. Accordingly, gaseous pressures during such high flow rate conditions exert forces against the directionable guide wall urging it rearwardly and retracting the valve gate structure, overcoming the oppositely directioned forces exerted by the spring. Thus, opening and closing of the valve structure is effected in a manner suitable for non-critical applications, in which precise control of the gate position is not required.

Exemplary applications of the apparatus include use in a gas turbine engine, in an aircraft or vehicular power plant, or as a power take-off turbine, as in in an automobile turbocharger system. In the latter application it is connected in series with the exhaust manifold and drivingly connected to a compressor pump, for delivering compressed air to the carburation system. When the apparatus is employed in such an automobile supercharger system, the increased rotational velocity attained even at reduced inlet flow rates maintains a substantial pumping action and resultant air pressure at the carburator during idling conditions, whereby there is no "supercharger lag" during initial acceleration from idle.

It can now be seen that the invention provides an efficient apparatus for translating motive energy into an alternative form. When employed as a gas driven turbine, the apparatus provides an efficient conversion of fluid flow and pressure into mechanical energy in the form of rotational output derived at the shaft 22. When employed as a pump, the apparatus is effective to translate rotational energy into fluid flow, and is operable under a variety of temperature and fluid conditions. When the apparatus is employed as a turbine, it obviates many of the difficulties previously experienced in the operation of turbines of the rotational disc type. The continuously adjustable inlet flow control means 54 provides enhanced efficiency and versatility of operation under varying operational regimes, and in the projected position, the converging inlet duct, in combination with the retricted area inlet, provides substantially increased efficiency. The use of planar rotor discs rather than bladed rotors and the use of component structures particularly adapted for carbonized composite materials, permits the substantial use of carbonized composite materials, permitting practicable operation at temperatures substantially in excess of 1800° F., thereby further enhancing operational efficiency. Because of the substantial use of planar sheet components as moveable elements in the apparatus, and the use of bonding-curing-pyrolization bonding procedures for joining the components, optionally supplemented by the composite pins, practicable, relatively inexpensive construction of the apparatus with composite materials is made possible. The system may thus be made operable at substantially higher temperatures than those employed in conventional turbines. Because of the high strength to weight ratio of carbonized composites, substantial rotational velocities are permitted, and warpage and thermal expansion of the parts are minimized because of the thermal stability of the materials. It will further be appreciated by those in the art that because of the substantially constant cross-sectional area of the duct 13 and the throat 45, and because of the direct injection of the inlet flow between the rotor discs 21, efficiency losses are minimized, in that expansion of the gasses occurs substantially within the rotor structure 20. As suggested above, the flow divider vanes in register with the rotor blades, and the smoothly contoured upper deflecting surface 47, further reduce turbulence and resultant energy losses, in that the flow is smoothly channeled into the spaces 51 between the discs.

Accordingly, the particular turbine construction, employing multiple rotor discs of a carbonized composite material, permits the high efficiency outputs obtainable only from high temperture gaseous flow substantially in excess of 1800° F., and the variable flow control system 54 permits versatile, practicable operation of such a multiple rotor disc structure.

While only two embodiments of the invention, together with modifications thereof, have been described in detail herein and shown in the accompanying drawing, it will be evident that various further modifications are possible in the arrangement and construction of its components without departing from the scope of the invention.

What is claimed is:

1. Rotational apparatus for translating motive energy, comprising:
   a housing defining a chamber;
   a plurality of mutually spaced disks rotatably mounted within the housing, each of the disks having at least one opening formed therethrough and a peripheral portion spaced radially outwardly from the at least one opening,
   a first passageway communicating with the housing chamber at a location adjacent the peripheral portions of the disks;
   a second passageway communicating with the housing chamber and with at least one opening formed through the respective disks;
   means for rotating the disks and inducing fluid flow through the chamber and through the first and second passageways; and
   flow control means mounted in the first passageway, wherein the flow control means comprises means for restricting fluid flow through a selected longitudinal portion of the rotor structure and for permitting fluid flow through the remaining longitudinal portion of the rotor structure extending axially along the rotor structure from the selected longitudinal portion of the rotor structure.

2. The apparatus of claim 1, wherein the flow control means comprises valve gate means mounted in series between the first passageway and the housing and moveably positioned for slideable movement alongside the rotor structure, the valve gate means comprising means permitting communication between the first passageway and a variable number of the discs and for restricting fluid communication with the other discs.

3. The apparatus of claim 2, wherein the housing opening is an elongated opening extending linearly, parallel with and alongside the rotor structure, and wherein the valve gate comprises an elongated, carbonized composite structure slideably mounted in the elongated opening.

4. The apparatus of claim 1, wherein the apparatus comprises fluid pumping means for pumping fluid through the housing chamber from the second to the first passageway, and wherein the means for inducing fluid flow comprises means drivingly connected to the shaft for rotating the rotor structure.

5. The apparatus of claim 4, wherein the first passageway comprises an outlet passageway communicating with the chamber through the first opening and the second passageway comprises an inlet passageway communicating with the chamber through the second opening.

6. The apparatus of claim 5, further comprising flow control means, mounted in the first passageway, for controlling the fluid flow exiting the housing chamber through the first passageway.

7. The apparatus of claim 6, wherein the flow control means comprises means, having a valving element moveable within the first passageway, for restricting fluid flow from a selected portion of the rotor structure.

8. The apparatus of claim 7, wherein the flow control means comprises valve gate means mounted in series between the first passageway and the housing and moveably positioned for slideable movement alongside the rotor structure, and the valve gate means comprising means permitting communication between the first passageway and a variable number of the discs and for restricting fluid communication with the other discs.

9. The apparatus of claim 8, wherein the first housing opening is an elongated, linear opening extending parallel with and alongside the rotor structure, and wherein the valve gate comprises an elongated, carbonized composite structure slideably mounted in the elongated opening.

10. The apparatus of claim 1, wherein the apparatus comprises a fluid driven turbine and wherein the means for rotating the discs comprises a source of fluid under presssure communicating with the housing chamber through the first passageway, for causing fluid flow through the chamber.

11. The apparatus of claim 10, the housing having an inlet opening communicating with the chamber adjacent the peripheral portions of the discs and an outlet opening communicating with the chamber adjacent the shaft, wherein the first passageway comprises an inlet passageway communicating with the chamber through the inlet opening and the second passageway comprises an outlet passageway communicating with the chamber through the outlet opening.

12. The apparatus of claim 11, the flow control means, mounted in the first passageway, for controlling fluid flow through the first passageway.

13. The apparatus of claim 12, wherein the flow control means comprises means for directing fluid flow to a selected portion of the rotor structure.

14. The apparatus of claim 12, wherein the flow control means comprises valve gate means mounted in series between the first passageway and the housing and moveably positioned for slideable movement alongside the rotor structure, the valve gate means comprising means permitting communication between the first passageway and a variable number of the discs and for restricting fluid communication with the other discs.

15. The apparatus of claim 14, wherein the housing opening is an elongated, linear opening extending parallel with and alongside the rotor structure, and wherein the valve gate comprises an elongated, carbonized composite structure slideably mounted in the elongated opening.

16. The apparatus of claim 11, wherein the first passageway extends along an axis extending tangentially of the peripheral portions of the carbonized composite discs.

17. A turbine apparatus comprising:
   a housing defining a chamber;
   a plurality of rotatable members mutually spaced along an axis within the housing to define respective chamber segments extending between respective mutually adjacent members, each of the members having at least one opening formed therethrough and communicating with at least one of the chamber segments, and a peripheral portion spaced radially outwardly from the at least one opening;
   a first, inlet passageway communicating with the housing chamber at a location adjacent the peripheral portions of the members;
   a second outlet passageway communicating with the housing chamber and with at least one opening formed through the respective members;
   means for conducting fluid under pressure through the first passageway to the rotatable members for rotating the members:

flow control means, having an adjustable valving means, for directioning fluid under pressure, received from the means for conducting fluid under pressure, through the first inlet passage toward a controllably variable number of the chamber segments and for attenuating fluid flow to others of the chamber segments spaced axially from the chamber segments toward which fluid under pressure is directioned by the flow control means.

18. The apparatus of claim 17, wherein the flow control means comprises a valve gate means for attenuating fluid flow to rotatable members not included in the controllably variable number of rotatable members.

19. The apparatus of claim 18, the housing having an elongated inlet opening communicating with the chamber and chamber segments, the valve gate means comprising an elongated structure slideably mounted adjacent the inlet opening for movement along the inlet opening.

20. The apparatus of claim 19, the rotatable members comprising annular discs having peripheral regions extending continuously around the circumference of the discs, the first, inlet passageway extending toward the annular discs along an axis tangential of the disc peripheral regions.

21. The apparatus of claim 20, the housing having an inlet throat area extending through the inlet opening and communicating between the inlet passageway and the housing chamber, the inlet throat area having a substantially constant cross-sectional area along its length between the inlet passageway and the housing chamber.

22. The apparatus of claim 21, the housing having a plurality of flow divider vanes projecting toward the rotor structure, in register and in parallel with respective ones of the annular discs.

23. The apparatus of claim 22, the housing having an inner surface area, adjacent the inlet throat, which is aligned with the inlet passageway and which comprises means for deflecting inflowing fluid, received from the inlet passageway, along a curved flow path which merges into the chamber segments of the rotor structure.

24. The apparatus of claim 19, further comprising control means for controlling the position of the valve gate means.

25. The apparatus of claim 24, wherein the control means includes servocontrolled actuator means for positioning the valvegate means, and programmed processing means for providing position control command signals to the actuator means in response to fluid flow conditions.

* * * * *